United States Patent
Cooper et al.

(10) Patent No.: US 6,621,423 B1
(45) Date of Patent: Sep. 16, 2003

(54) SYSTEM AND METHOD FOR EFFECTIVELY IMPLEMENTING AN ELECTRONIC VISUAL MAP DEVICE

(75) Inventors: Ted J. Cooper, Sunnyvale, CA (US); Michael W. Blasgen, Los Gatos, CA (US); David G. Longendyke, Vernon, NJ (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/655,608

(22) Filed: Sep. 6, 2000

Related U.S. Application Data (60) Provisional application No. 60/187,320, filed on Mar. 6, 2000.

(51) Int. Cl.⁷ .............................................. G08G 1/123
(52) U.S. Cl. ............................. 340/995.24; 340/995.12; 701/211; 701/213
(58) Field of Search .................................. 340/995, 990, 340/988, 991, 992, 993, 994, 995.1, 995.12, 995.24; 701/211, 213, 208, 209, 210, 212, 214, 215, 216

(56) References Cited

U.S. PATENT DOCUMENTS

| | | | | |
|---|---|---|---|---|
| 4,494,116 A | * | 1/1985 | Tagami et al. | 340/995 |
| 4,899,285 A | * | 2/1990 | Nakayama et al. | 342/357 |
| 4,992,947 A | * | 2/1991 | Nimura et al. | 340/990 |
| 5,587,911 A | | 12/1996 | Asano et al. | 340/995 |
| 5,613,055 A | * | 3/1997 | Shimoura et al. | 340/995 |
| 5,648,768 A | | 7/1997 | Bouve | 340/988 |
| 5,739,772 A | * | 4/1998 | Nanba et al. | 340/990 |
| 5,874,905 A | | 2/1999 | Nanba et al. | 340/995 |
| 5,908,465 A | | 6/1999 | Ito et al. | 701/211 |
| 5,944,768 A | | 8/1999 | Ito et al. | 701/200 |
| 5,945,976 A | | 8/1999 | Iwamura et al. | 345/139 |
| 5,982,298 A | * | 11/1999 | Lappenbusch et al. | 340/995 |
| 6,006,161 A | * | 12/1999 | Katou | 340/995 |
| 6,035,253 A | | 3/2000 | Hayashi et al. | 701/211 |
| 6,038,507 A | | 3/2000 | Miyano | 701/202 |
| 6,040,824 A | | 3/2000 | Maekawa et al. | 345/173 |
| 6,175,802 B1 | * | 1/2001 | Okude et al. | 701/208 |
| 6,182,010 B1 | * | 1/2001 | Berstis | 340/995 |
| 6,199,014 B1 | * | 3/2001 | Walker et al. | 701/211 |
| 6,285,317 B1 | * | 9/2001 | Ong | 701/211 |
| 6,466,735 B1 | * | 10/2002 | Kozuka et al. | 701/208 |

* cited by examiner

*Primary Examiner*—Brent A. Swarthout
(74) *Attorney, Agent, or Firm*—Gregory J. Koerner; Simon & Koerner LLP (57) ABSTRACT

A system and method for effectively implementing an electronic visual map device comprises a visual map application that provides selected route images for display upon a display device in an initial route mode. The visual map application may also provide selected destination images and related destination information for display upon the display device in a final destination mode. The route images and the destination images may be stored locally in a memory device, or alternately may be downloaded as needed from a distributed computer network using a network manager.

11 Claims, 8 Drawing Sheets

SYSTEM AND METHOD FOR EFFECTIVELY IMPLEMENTING AN ELECTRONIC VISUAL MAP DEVICE

This application claims priority from Provisional Application No. 60/187,320, filed Mar. 6, 2000.

BACKGROUND SECTION

1. Field of the Invention

This invention relates generally to techniques for providing visual information, and relates more particularly to a system and method for effectively implementing an electronic visual map device.

2. Description of the Background Art

Implementing effective methods for providing visual information is a significant consideration for designers and manufacturers of contemporary electronic devices. However, effectively presenting visual information in electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively accesses, processes, and displays digital image data may benefit from an efficient implementation because of the large amount and complexity of the digital data involved.

Various types of mobile orientation systems for travel usage may benefit from improved visual information presentation techniques. For example, an electronic device may advantageously obtain and present image data through appropriate means to thereby facilitate the travel process for a system user.

Due to growing demands on system resources and substantially increasing data magnitudes, it is apparent that developing new techniques for providing visual information is a matter of concern for related electronic technologies. Therefore, for all the foregoing reasons, developing effective systems for presenting visual information remains a significant consideration for designers, manufacturers, and users of contemporary electronic devices.

SUMMARY

In accordance with the present invention, a system and method are disclosed for effectively implementing a visual map device. In one embodiment, the visual map device initially enters a route mode in which a visual map application preferably determines an intended destination for a particular trip or excursion by utilizing any appropriate technique or method. For example, the foregoing destination may be supplied by a system user, or alternately may be determined through information sensors that are coupled to the visual map device.

The visual map application may preferably then determine a starting location that corresponds to the current location of either the visual map device or any other appropriate location reference. The visual map device may preferably function in several location-update modes to determine a starting location and subsequent locations. The foregoing location-update modes preferably include an automatic mode in which the visual map application automatically determines a current location based upon various types of location information provided by the information sensors. The foregoing location-update modes may preferably also include a manual mode in which a system user preferably provides location information to the visual map device.

Next, the visual map application preferably selects a suggested route based upon the previously-determined destination and current location. The visual map application then preferably may determine whether a system user has verified the suggested route that was selected by the visual map application.

A database manager then preferably generates selected route images from route images stored in a map database in the visual map device. A display manager responsively displays a first route image on a display device coupled to the visual map device. The system user may preferably verify the displayed first route image that was provided by the display manager.

After the foregoing user verification of the first route image, the visual map device may sequentially update and display the series of selected route images on the display device, in accordance with the present invention. The visual map application preferably monitors the displayed route images to determine whether a final one of the selected route images has been displayed on the display device. When a final route image has been displayed on the display device, then the visual map device preferably enters a destination mode in which the visual map application preferably determines whether appropriate destination images are locally stored in the map database of the visual map device.

If appropriate locally-stored destination images are available in the map database, then, a display manager may preferably obtain and display relevant destination images on the display device. The visual map application may preferably update the displayed destination images in response to various factors such as automatic location information or system user input.

However, if locally-stored destination images are not available in the map database, then the visual map application preferably determines whether to remotely access appropriate destination images based on various factors such as user input, user preferences, or information provided from the information sensors. Then, a network manager may preferably download appropriate destination images from a distributed computer network. The display manager may responsively display the downloaded destination images upon the display device.

Alternately, if the visual map application determines not to remotely access appropriate destination images, then, the display manager may preferably display one or more destination maps from the map database for utilization by a system user. Finally, the visual map application preferably determines whether the selected destination has been reached by the system user. When the selected destination has been reached, the foregoing visual map device procedure terminates. The present invention thus provides an improved system and method for effectively implementing an electronic visual map device.

DETAILED DESCRIPTION

The present invention relates to an improvement in visual information presentation techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for effectively implementing an electronic visual map device, and preferably includes a visual map application that provides selected route images for display upon a display device in an initial route mode. The visual map application may preferably also provide selected destination images and related destination information for display upon the display device in a final destination mode. The route images and the destination images may be stored locally in a memory device, or alternately may be downloaded as needed from a distributed computer network using a network manager.

Figure 1:
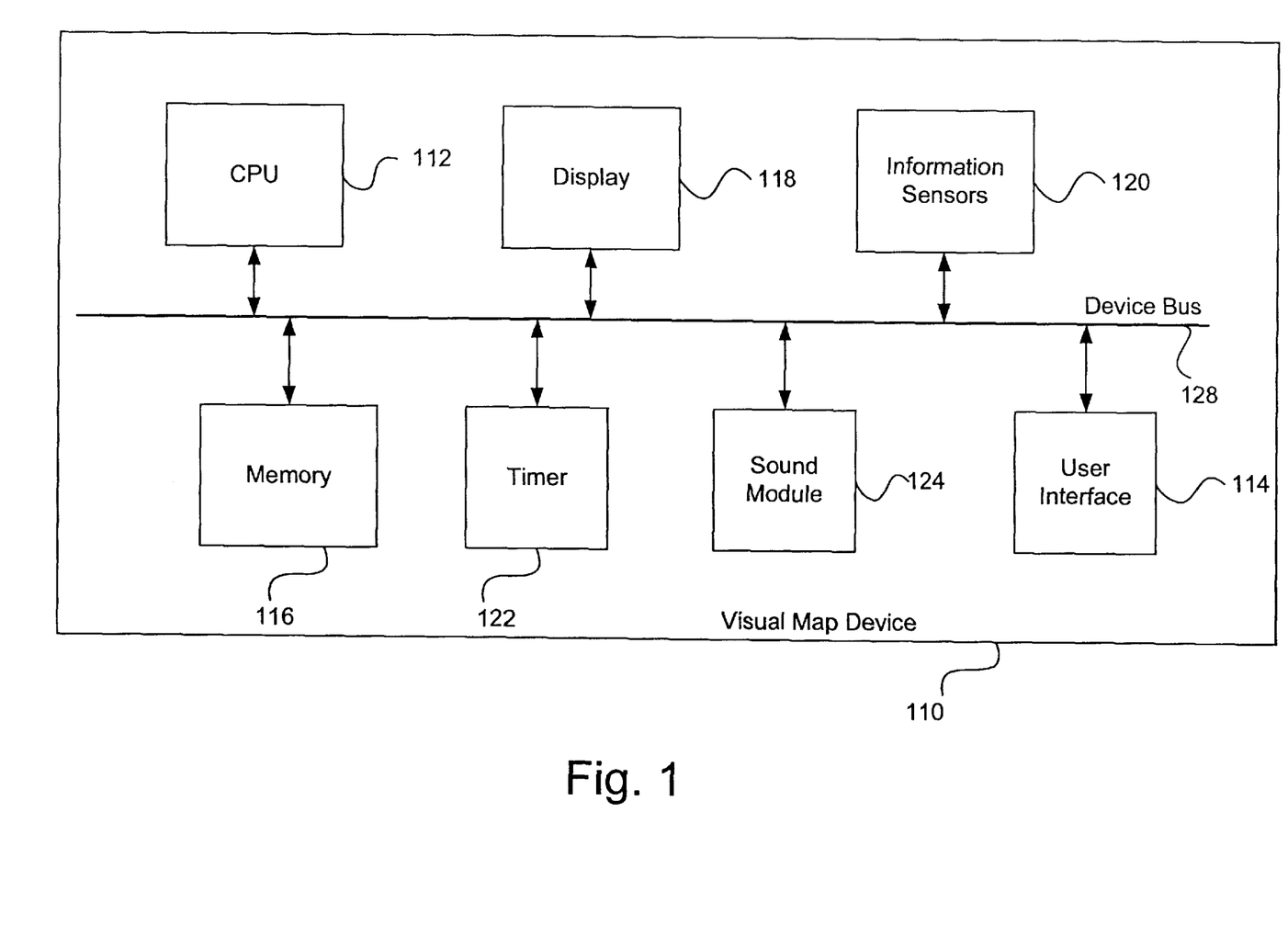
FIG. 1 is a block diagram for one embodiment of a visual map device, in accordance with the present invention.

Referring now to FIG. 1, a block diagram for one embodiment of a visual map device 110 is shown, in accordance with the present invention. In the FIG. 1 embodiment, visual map device 110 preferably includes, but is not limited to, a central processing unit (CPU) 112, a user interface 114, memory 116, a display 118, information sensors 120, a timer 122, and a sound module 124. The foregoing components of visual map device 110 may preferably be coupled to, and communicate through, a device bus 128. In alternate embodiments, visual map device 110 may readily be implemented using various components and configurations in addition to, or instead of, those discussed in conjunction with the FIG. 1 embodiment. Furthermore, visual map device 110 may be implemented as any appropriate type of electronic device. For example, visual map device 110 may be implemented as an automobile navigation system, a personal digital assistant (PDA), or as a personal computer.

In the FIG. 1 embodiment, CPU 112 may be implemented to include any appropriate and compatible microprocessor device that preferably executes software instructions to thereby control and manage the operation of visual map device 110. The FIG. 1 display 118 preferably may include any effective type of display technology including a cathode-ray-tube monitor or a liquid-crystal display device. In certain embodiments, display 118 may preferably include a "heads-up" display that may be positioned at approximately eye-level for efficient utilization by a system user, so that various images along a given route may be viewed on display 118 without significantly deflecting a system user's field of view from the particular route. Display 118 is further discussed below in conjunction with FIG. 5.

In the FIG. 1 embodiment, information sensors 120 preferably may include a plurality of information interfaces to receive and process any required types of relevant information for use by visual map device 110. Information sensors 120 are further discussed below in conjunction with FIG. 6. In the FIG. 1 embodiment, memory 116 may be implemented to include any combination of desired storage devices, including, but not limited to, read-only memory (ROM), random-access memory (RAM), and various types of non-volatile memory, such as floppy disks or hard disks. The contents and functionality of memory 116 are further discussed below in conjunction with FIGS. 2 through 4.

In the FIG. 1 embodiment, timer 122 preferably may provide timing support for instances in which visual map device 110 temporarily loses automatic location information, and responsively enters a drop-out mode that is further discussed below in conjunction with FIG. 6. Sound module 124 preferably may include appropriate interfaces to support audio functionality for visual map device 110. For example, in certain embodiments, sound module 124 may include, but is not limited to, an audio processing module, a power amplifier, one or more speaker devices, and a microphone device.

In the FIG. 1 embodiment, user interface 114 preferably may include any effective means to allow a system user to communicate with visual map device 110. For example, user interface 114 may support a keyboard device, a wireless remote control device, a speech-recognition module with corresponding microphone, a graphical user interface with touch-screen capability, and a selection button array mounted externally on visual map device 110. The functionality and operation of visual map device 110 is further discussed below in conjunction with FIGS. 2 through 8.

Figure 2:
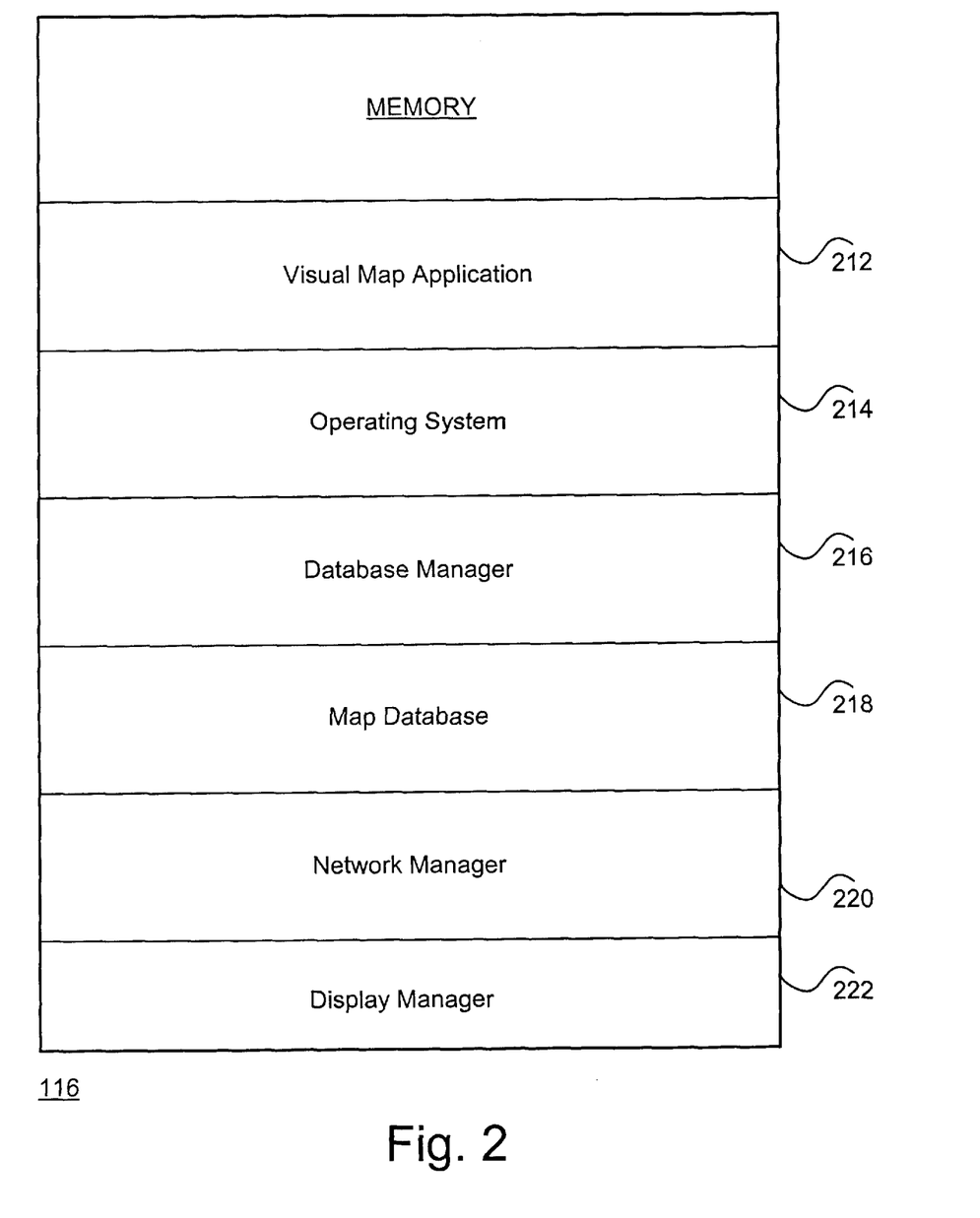
FIG. 2 is a block diagram for one embodiment of the memory of FIG. 1, in accordance with the present invention.

Referring now to FIG. 2, a block diagram for one embodiment of the FIG. 1 memory 116 is shown, in accordance with the present invention. In the FIG. 1 embodiment, memory 116 preferably includes, but is not limited to, a visual map application 212, an operating system 214, a database manager 216, a map database 218, a network manager 220, and a display manager 222. In alternate embodiments, memory 116 may readily include various other components in addition to, or instead of, those components discussed in conjunction with the FIG. 2 embodiment.

In the FIG. 2 embodiment, visual map application 212 may include software instructions that are preferably executed by CPU 112 (FIG. 1) to perform various functions and operations for visual map device 110. The particular nature and functionality of visual map application 212 preferably varies depending upon factors such as the specific type and particular use of the corresponding visual map device 110.

In the FIG. 2 embodiment, operating system 214 preferably controls and coordinates low-level functionality of visual map device 110. Database manager 216 preferably may interface between visual map application 212 and map database 218 to store and retrieve appropriate information for display by visual map device 110. Map database 218 preferably may include any required information for use by visual map device 110. Map database 218 is further discussed below in conjunction with FIG. 3.

In the FIG. 2 embodiment, network manager 220 preferably may control bi-directional communications between visual map device 110 and a distributed computing network. For example, network manager 220 may include a browser module to allow visual map device 110 to access and download information from the Internet. Display manager 222 preferably coordinates and controls the presentation of appropriate visual information on display 118 in response to instructions from visual map application 212. The functionality and operation of visual map application 212 and map database 218 are further discussed below in conjunction with FIGS. 3 through 8.

Figure 3:
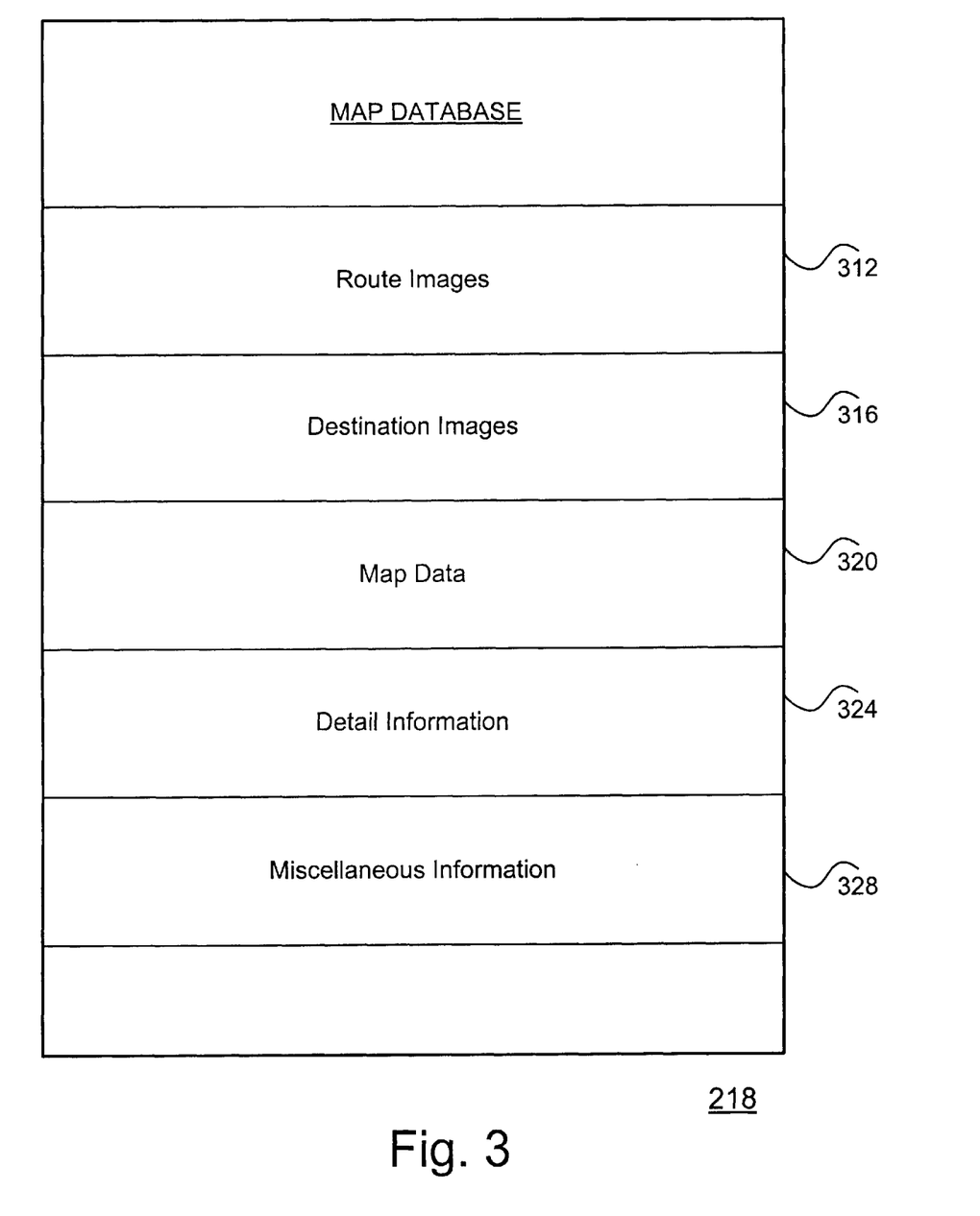
FIG. 3 is a block diagram for one embodiment of the map database of FIG. 2, in accordance with the present invention.

Referring now to FIG. 3, a block diagram for one embodiment of the FIG. 2 map database 218 is shown, in accordance with the present invention. In the FIG. 3 embodiment, map database 218 preferably may include, but is not limited to, route images 312, destination images 316, map data 320, detail information 324, and miscellaneous information 328. In alternate embodiments, map database 218 may readily include various other components in addition to, or instead of, those components discussed in conjunction with the FIG. 3 embodiment.

In the FIG. 3 embodiment, route images 312 preferably may include image data corresponding to any desired images of given locations along a particular route. In certain embodiments, route images 312 may preferably be captured using an eye-level viewpoint (as opposed to the bird's-eye viewpoint utilized by conventional maps) to thereby provide a more intuitive orientation resource for system users. For example, in certain embodiments, route images 312 preferably may include sets of image data corresponding to any noteworthy, noticeable, well-known, or otherwise significant objects from a given route. Such objects may include natural or man-made objects that may be readily seen from an eye-level viewpoint by a system user and preferably may be viewed in the general direction of travel.

Similarly, in the FIG. 3 embodiment, destination images 316 preferably may include image data corresponding to any desired images of given locations or objects near a particular destination. In certain embodiments, destination images 316 may preferably be captured using an eye-level viewpoint (as opposed to the bird's-eye viewpoint utilized by conventional maps) to thereby provide a more intuitive orientation resource for system users. For example, in certain embodiments, destination images 316 preferably may include sets of image data corresponding to any noteworthy, informative, relevant, or otherwise significant objects associated with a given destination. Such objects may include natural or man-made objects that may be helpful to a system user when arriving at a particular destination and preferably may be viewed in the general direction of travel.

In certain embodiments, destination images 316 or route images 312 may comprise several discrete databases (not shown) including a separate user-specific image database of selected images that a system user may wish to utilize on a recurring basis, as well as a separate temporary image database of selected images that a system user may need to utilize on a less frequent basis. The images for the temporary database may be obtained from any suitable source including removable storage media, or a wireless image-source service.

In the FIG. 3 embodiment, route images 312 may typically be viewed on display 118 to provide orientation information to a system user that is traveling along a particular corresponding route. In contrast, in the FIG. 3 embodiment, destination images 316 may typically be viewed on display 118 to provide relevant visual information to a system user when arriving at a particular corresponding destination.

In the FIG. 3 embodiment, map data 320 preferably may include information necessary to create and display appropriate maps upon display 118. Detail information 324 preferably may include relevant data and detailed information corresponding to a given route or destination. For example, detail information 324 may include specific information regarding a particular destination, such as parking locations, contact information, and entry access information. Miscellaneous information 328 may include any other appropriate information for utilization by visual map device 110.

Figure 4:
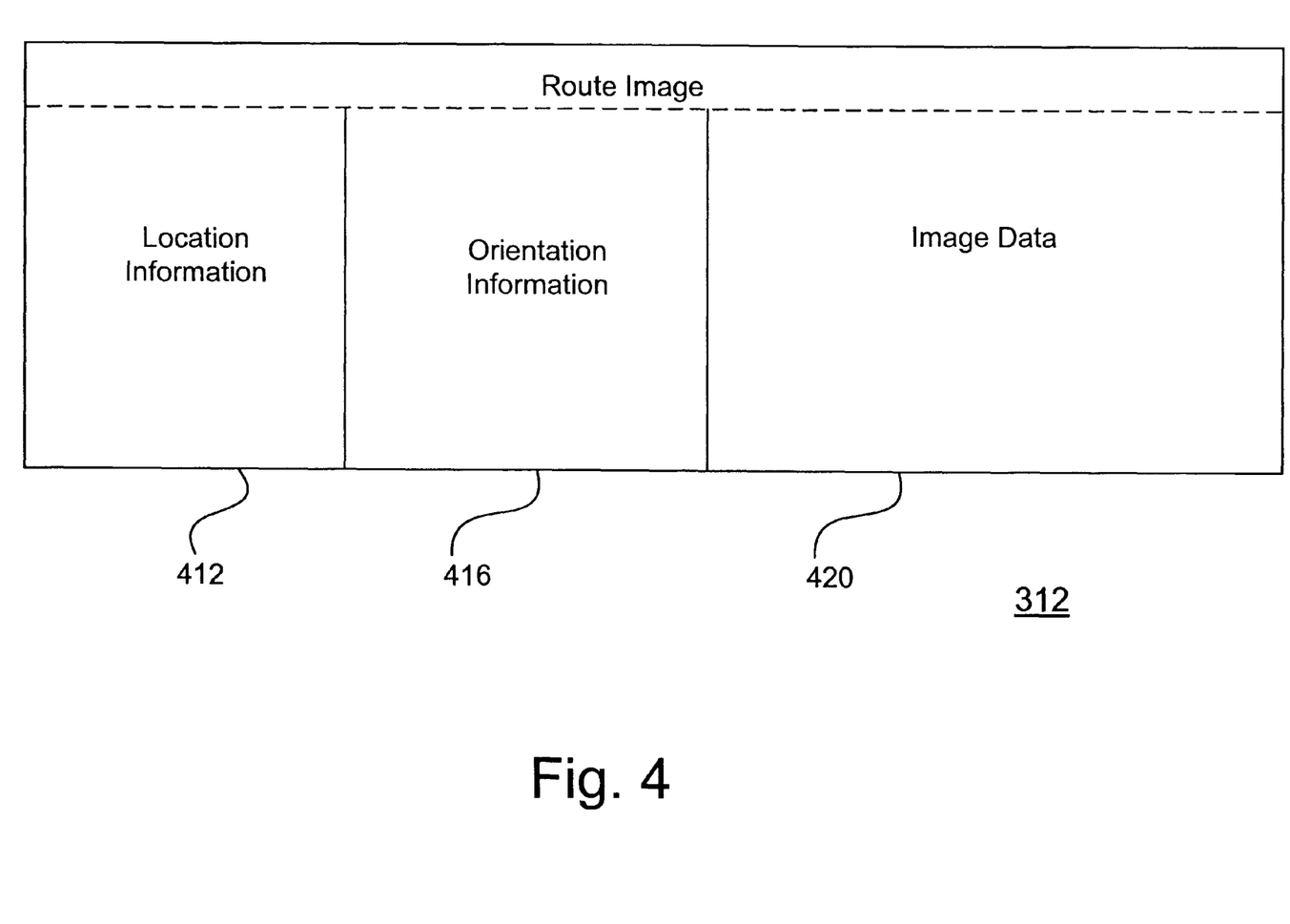
FIG. 4 is a block diagram for one embodiment of an exemplary route image of FIG. 3, in accordance with the present invention.

Referring now to FIG. 4, a block diagram for one embodiment of an exemplary FIG. 3 route image 312 is shown, in accordance with the present invention. In the FIG. 4 embodiment, route image 312 preferably may include, but is not limited to, location information 412, orientation information 416, and image data 420. In alternate embodiments, route image 312 may readily include various other components in addition to, or instead of, those components discussed in conjunction with the FIG. 4 embodiment.

In the FIG. 4 embodiment, location information 412 may preferably include any appropriate information to identify the specific geographical location of an object associated with image data 420. Similarly, orientation information 416 may preferably include any appropriate information to identify the specific directional orientation of an object associated with image data 420. For example, orientation information may include specific compass coordinates that correspond to the viewing direction with which image data 420 was captured.

In the FIG. 4 embodiment, image data 420 preferably includes any appropriate information to allow display manager 222 of visual map device 110 to effectively present an image of the associated route image 312 on display 118. In accordance with the present invention, the foregoing discussion of location information 412, orientation information 416, and image data 420 is presented in the context of a route image 312. However, in certain embodiments, destination images 316 may similarly include location information 412, orientation information 416, and image data 420, as discussed above.

Figure 5:
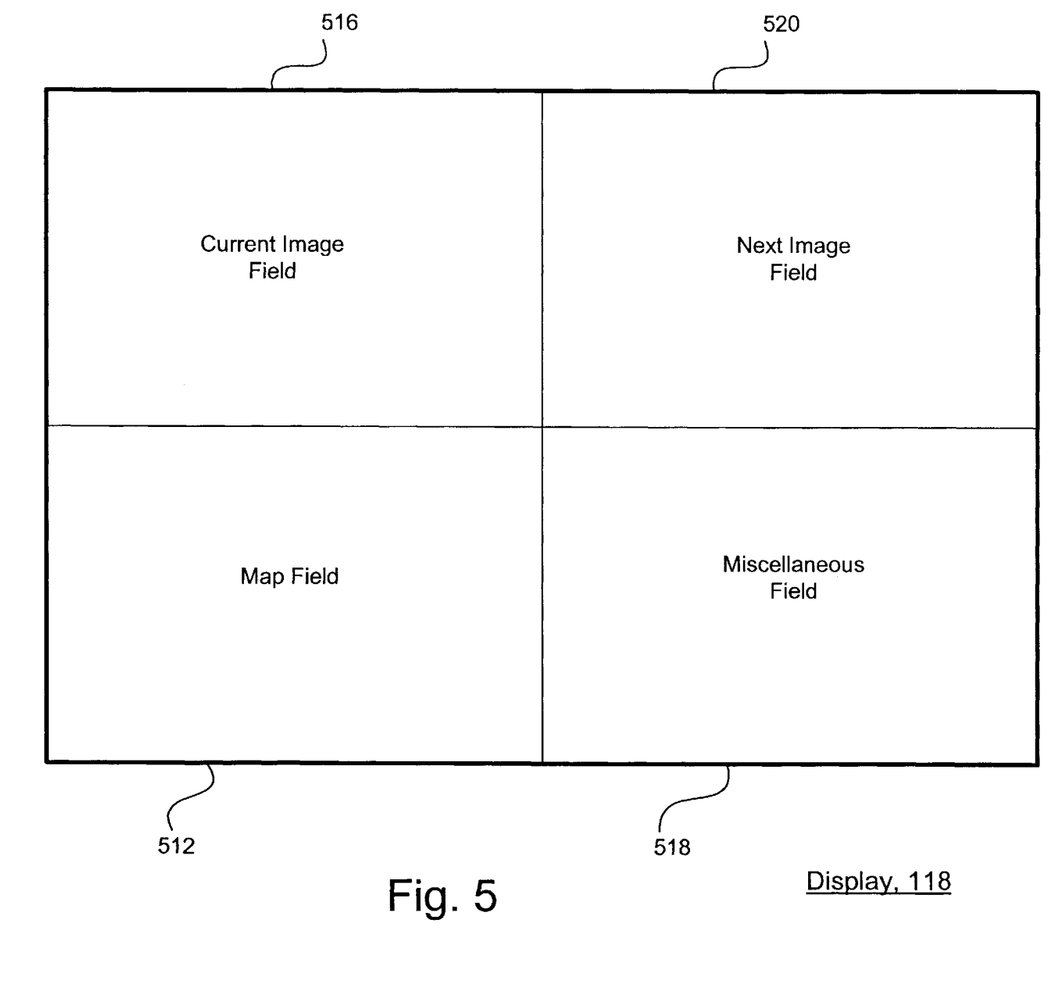
FIG. 5 is a block diagram for one embodiment of the display of FIG. 1, in accordance with the present invention.

Referring now to FIG. 5, a block diagram for one embodiment of the FIG. 1 display 118 is shown, in accordance with the present invention. In the FIG. 5 embodiment, display 118 preferably includes, but is not limited to, a map field 512, a current image field 516, a next image field 520, and a miscellaneous field 518. The FIG. 5 embodiment is presented for purposes of illustration, and in alternate embodiments, display 118 may readily include various other fields or elements in addition to, or instead of, those fields or elements discussed in conjunction with the FIG. 5 embodiment.

In the FIG. 5 embodiment, display manager 222 may preferably utilize map field 512 to display map information obtained from sources such as map database 218. In certain embodiments, map field 512 may display and update a map display that corresponds to a current or a selected location for visual map device 110. In addition, map field 512 may also include a graphical representation of a selected route, as well as a graphical representation of an actual corresponding route taken by a user of visual map device 110.

In the FIG. 5 embodiment, display manager 222 may preferably utilize current image field 516 to display visual information obtained from sources such as route images 312 or destination images 316 of map database 218. In certain embodiments, current image field 516 may preferably display and update an image that corresponds to a current or an imminent location for visual map device 110.

In the FIG. 5 embodiment, display manager 222 may preferably utilize next image field 520 to display visual information obtained from sources such as route images 312 or destination images 316 of map database 218. In certain embodiments, next image field 520 may preferably display and update an image that corresponds to an imminent or a future location for visual map device 110.

In the FIG. 5 embodiment, display manager 222 may preferably utilize miscellaneous field 518 to display visual information obtained from sources such as route images 312, destination images 316, detail information 324, or miscellaneous information 328 of map database 218. For example, miscellaneous field 518 may display information such as gas station locations, restaurant locations, ATM locations, hospital locations, or tourist attraction locations. In the FIG. 5 embodiment, miscellaneous field 518 may include a plurality of sub-fields that display manager 222 may utilize to display any desired information for visual map device 110.

In certain embodiments, miscellaneous field 518 may preferably display and update an image that corresponds to a prior location for visual map device 110. In alternate embodiments, miscellaneous field 518 may also advantageously display any desired information related to a particular route, route image 312, destination, or destination image 316.

Figure 6:
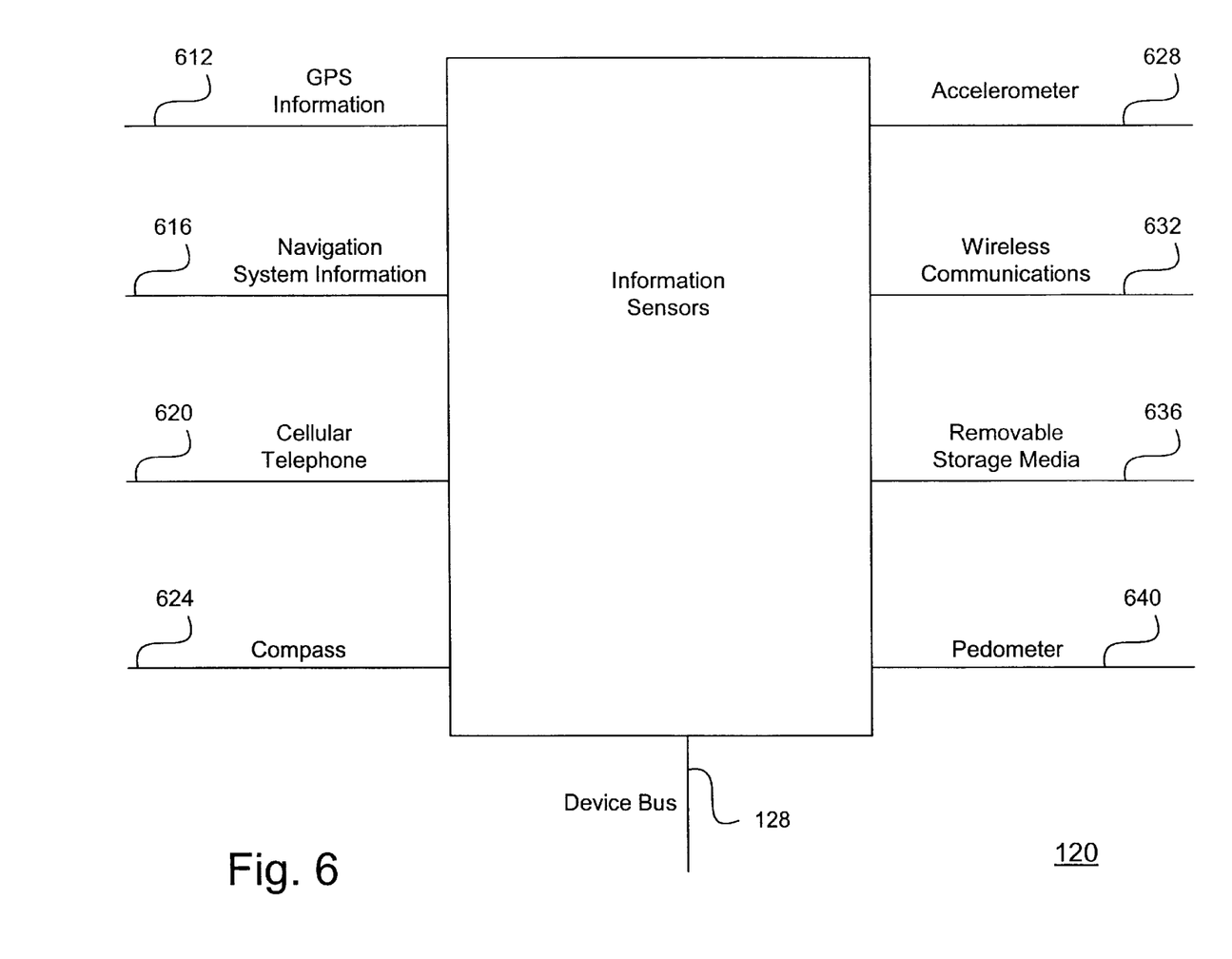
FIG. 6 is a block diagram for one embodiment of the information sensors of FIG. 1, in accordance with the present invention.

Referring now to FIG. 6, a block diagram for one embodiment of the FIG. 1 information sensors 120 is shown, in accordance with the present invention. In the FIG. 6 embodiment, information sensors 120 preferably may include, but, are not limited to, global positioning system (GPS) information 612, navigation system information 616, cellular telephone 620, compass 624, accelerometer 628, wireless communications 632, removable storage media 636, and pedometer 640. Information sensors 120 may preferably communicate with visual map device 110 via device bus 128. In alternate embodiments, information sensors 120 may readily include various other components in addition to, or instead of, those components discussed in conjunction with the FIG. 6 embodiment.

In the FIG. 6 embodiment, visual map device 110 may preferably operate in several different location-update modes. For example, a system user may select visual map device 110 to function in an automatic mode in which visual map device 110 automatically determines and updates current geographic location information using input from sources such as information sensors 120. In addition, visual map device 110 may also function in a manual mode in which a system user manually supplies visual map device 110 with appropriate geographic location information using various means such as user interface 114.

In the FIG. 6 embodiment, GPS information 612 preferably may include accurate geographic location information provided by an external GPS system. The foregoing geographic location information may be received by information sensors 120, and responsively provided to visual map application 212 for appropriate use to update the current location of visual map device 110. In certain embodiments, visual map device may also enter a drop-out mode when GPS information 612 (or other positioning information) supplied during the foregoing automatic mode becomes temporarily interrupted. Visual map device may then responsively utilize timer 122 (FIG. 1) to maintain and project continuing location values based upon previous location and navigation values until the interruption to the automatic mode terminates and valid location information again becomes available.

In the FIG. 6 embodiment, navigation system information 616 may include any relevant information by which visual map application 212 may determine the geographic location of visual map device 110. For example, navigation system information 616 may preferably include information from an automobile navigation system. In addition, navigation system information 616 may also include inertial navigation information in which a starting point, all accelerations, and all changes of direction may be analyzed to determine a current geographic location of visual map device 110.

In the FIG. 6 embodiment, cellular telephone 620 may preferably provide any desired information for enabling flexible functionality of visual map device 110. For example, cellular telephone 620 may provide detailed destination information to visual map device 110, such as the specific destination of a selected route, or an Internet address for accessing necessary destination information for a selected route.

Compass 624 may provide orientation information for use by visual map device 110, especially in environments in which a system user is utilizing a light-weight visual map device 110 while traveling by foot. Accelerometer 628 preferably may provide accurate acceleration information for use by visual map application 212 to establish a current geographic location for visual map device 110.

In the FIG. 6 embodiment, wireless communications 632 preferably may include any effective means to remotely communicate with an external entity such as an Internet server, to thereby exchange relevant information for successful operation of visual map device 110. For example, in certain embodiments, visual map device 110 may advantageously utilize a wireless communication module (not shown) and information sensors 120 to access an appropriate location on a distributed computer network.

Visual map device 110 may then download relevant or desired information, such as additional detailed destination information corresponding to a particular destination of interest. Map database 218 thus need only store detail information 324 for frequently-visited destinations, thereby conserving valuable memory resources.

In the FIG. 6 embodiment, removable storage media 636 may preferably provide any desired information for facilitating the operation of visual map device 110. For example, removable storage media 636 may provide detailed destination information to visual map device, such as the specific destination of a selected route, or an Internet address for accessing necessary destination information for a selected route. Pedometer 640 may provide orientation information for use by visual map device 110, especially in environments in which a system user is utilizing a light-weight visual map device 110 while traveling by foot.

Figure 7:
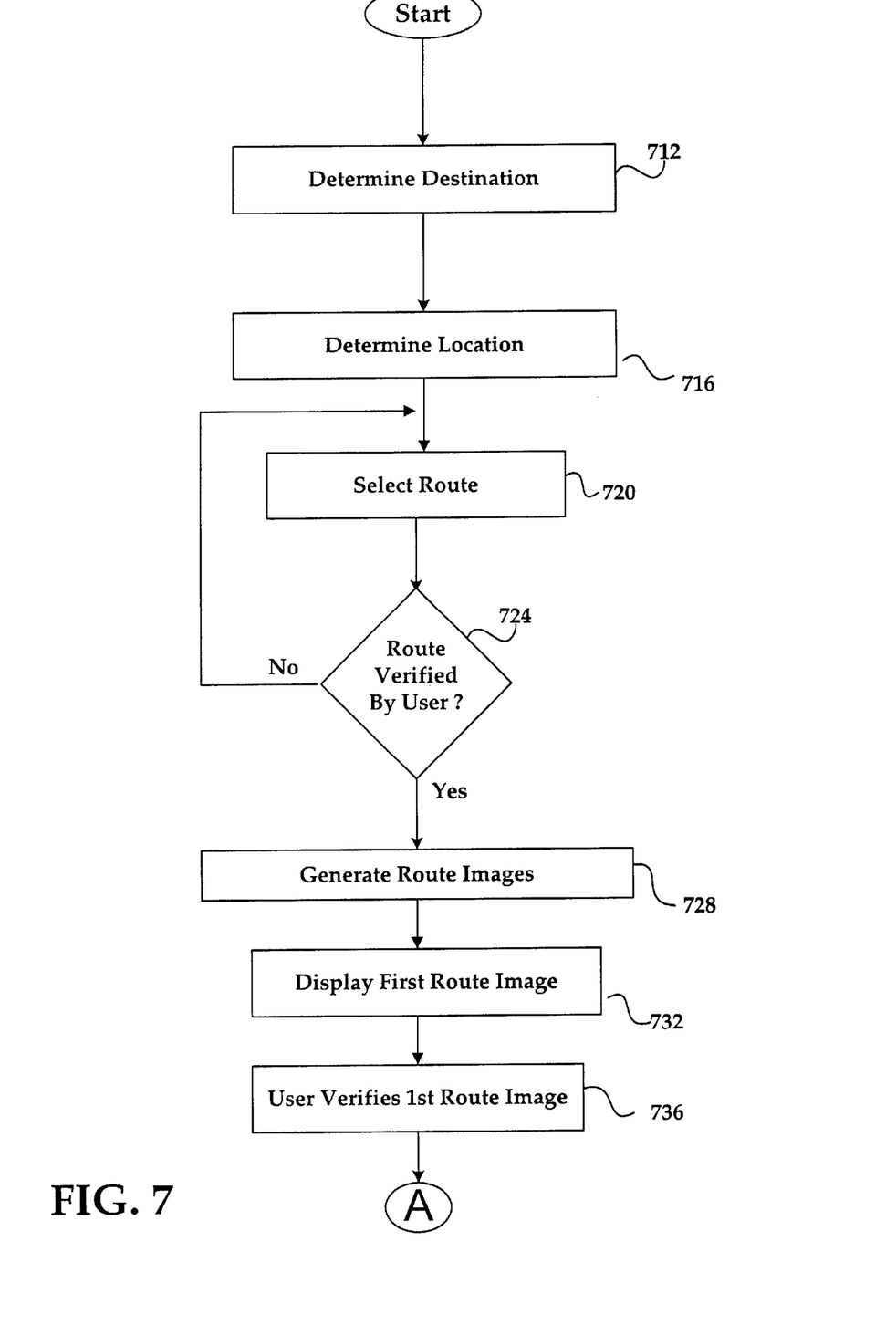
FIG. 7 is a flowchart of initial method steps for utilizing a visual map device, in accordance with one embodiment of the present invention.

Referring now to FIG. 7, a flowchart of initial method steps for utilizing a visual map device 110 is shown, in accordance with one embodiment of the present invention. The FIG. 7 example is presented for purposes of illustration, and, in alternate embodiments, the present invention may readily utilize various other steps and sequences than those discussed in conjunction with the FIG. 7 embodiment.

In the FIG. 7 embodiment, in step 712, visual map device 110 preferably enters a route mode in which visual map application 212 initially determines an intended destination for a particular trip or excursion by utilizing any appropriate technique or method. For example, the foregoing destination may be supplied by a system user, or alternately may be determined through information sensors 120, as discussed above in conjunction with FIG. 6. In certain situations, a system user may select visual map device 110 to function in a wander mode in which no specific destination is initially provided.

Then, in step 716, visual map application 212 preferably may determine a starting location that corresponds to the current location of either visual map device 110 or any other appropriate location reference. Visual map device 110 may function in several location-update modes to determine a starting location and subsequent locations. The foregoing location-update modes preferably include an automatic mode and a manual mode, as discussed above in conjunction with FIG. 6.

In step 720, visual map application 212 preferably selects a suggested route based upon the previously-determined destination and current starting location. In the FIG. 7 embodiment, visual map application 212 then preferably determines whether a system user has verified or authorized the suggested route that was selected in foregoing step 720. The verification of step 724 may advantageously permit a system user to review a selected route in view of recent changes in traffic patterns and other relevant variables. However, in certain embodiments, user verification of a suggested route may not be required.

In step 728, database manager 216 preferably generates selected route images from route images 312 of map database 218, and, in step 732, display manager 222 responsively displays a first route image on display 118. In step 736, the system user may preferably verify the displayed first route image to confirm that the selected route images that were provided by display manager 222 in foregoing step 728 are correct, and that visual contact with the first selected route image has occurred. The FIG. 7 process then advances to letter "A", which is also the starting point of the following FIG. 8 flowchart.

Figure 8:
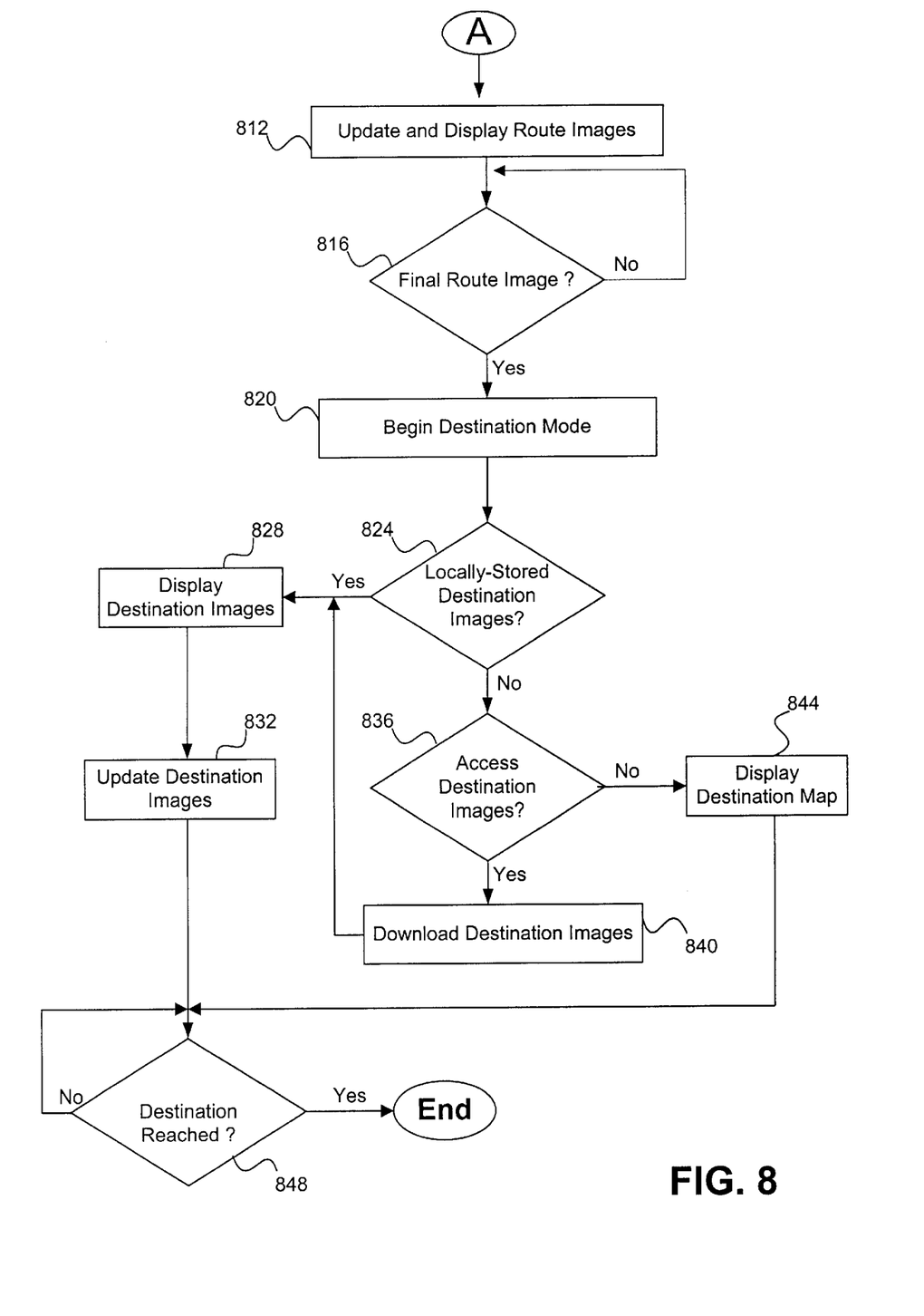
FIG. 8 is a flowchart of final method steps for utilizing a visual map device, in accordance with one embodiment of the present invention.

Referring now to FIG. 8, a flowchart of final method steps for utilizing a visual map device 110 is shown, in accordance with one embodiment of the present invention. The FIG. 8 example is presented for purposes of illustration, and, in alternate embodiments, the present invention may readily utilize various other steps and sequences than those discussed in conjunction with the FIG. 8 embodiment.

In the FIG. 8 embodiment, after the foregoing user verification of a first route image (step 736 of FIG. 7), visual map device 110 may sequentially update and display a series of the selected route images 312 on display 118, in accordance with the present invention. In step 816, visual map application 212 preferably monitors the foregoing update procedure of step 812 to determine whether a final route image 312 has been presented on display 118.

In step 820, if a final route image 312 has been presented on display 118, then, in step 820, visual map device 110 preferably enters a destination mode. In step 824, visual map application 212 preferably determines whether appropriate locally-stored destination images are available in destination images 316 of map database 218.

If appropriate locally-stored destination images are available in destination images 316 of map database 218, then, in step 828, display manager 222 preferably accesses and displays the destination images 316 on display 118. In step 832, visual map application 212 may preferably update the displayed destination images 316 in response to various factors such as automatic location information or system user input. The FIG. 8 process then advances to step 848.

In foregoing step 824, if locally-stored destination images are not available in map database 218, then, in step 836, visual map application 212 preferably determines whether to remotely access appropriate destination images based on various factors such as user input, user preferences, or information provided from information sensors 120. Then, in step 840, network manager 220 may preferably access and download appropriate destination images. The FIG. 8 procedure may then advance to step 828 to display the downloaded destination images as discussed above.

In foregoing step 836, if visual map application 212 determines not to remotely access destination images using network manager 220, then, in step 844, display manager 222 preferably may display one or more destination maps from map data 320 for use by a system user. Finally, in step 848, visual map application 212 preferably determines whether the selected destination has been reached by the system user. When the selected destination has been reached, the foregoing visual map device procedure of FIG. 8 terminates.

The invention has been explained above with reference to certain embodiments. The foregoing embodiments of FIG. 7 and FIG. 8 discuss the present invention in the context of a mobile visual map device that preferably accompanies a system user along a selected route. However, a system user may alternately utilize a non-mobile visual map device 110 to select and print hard copies of a map that is advantageously annotated with appropriate route images 312 and destination images 316 for use on a particular route.

Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for implementing a visual map device, comprising:

a map database coupled to said visual map device, said map database including visual image information, said visual image information including at least one of route images and destination images that are each initially captured at a substantially eye-level viewpoint by utilizing a photographic imaging device;

a map application configured to provide said visual image information to a display device; and a processor coupled to said visual map device to execute said map application, said map application and a network manager accessing and downloading said destination images from a distributed computer network when said destination images are not locally stored in a memory device coupled to said visual map device, a display manager and said map application responsively presenting and updating said destination images upon said display.

2. A system for implementing a visual map device, comprising:

a map database coupled to said visual map device, said map database including visual image information, said visual image information including at least one of route images and destination images that are each initially captured at a substantially eye-level viewpoint by utilizing a photographic imaging device;

a map application configured to provide said visual image information to a display device; and a processor coupled to said visual map device to execute said map application, said map application and a database manager accessing and displaying destination map information from said map database when said destination images are not locally stored in a memory device coupled to said visual map device, and when a network manager additionally does not download said destination images from a distributed computer network.

3. A method for implementing a visual map device, comprising the steps of:

storing visual image information in a map database coupled to said visual map device, said visual image information including at least one of route images and destination images that are each initially captured at a substantially eye-level viewpoint by utilizing a photographic imaging device;

providing said:visual image information to a display device using a map application; and executing said map application with a processor coupled to said visual map device, said map application and a network manager accessing and downloading said destination images from a distributed computer network when said destination images are not locally stored in a memory device coupled to said visual map device, a display manager and said map application responsively presenting and updating said destination images upon said display.

4. A method for implementing a visual map device, comprising the steps of:

storing visual image information in a map database coupled to said visual map device, said visual image information including at least one of route images and destination images that are each initially captured at a substantially eye-level viewpoint by utilizing a photographic imaging device;

providing said visual image information to a display device using a map application; and executing said map application with a processor coupled to said visual map device, said map application and a database manager accessing and displaying destination map information from said map database when said destination images are not locally stored in a memory device coupled to said visual map device, and when a network manager additionally does not download said destination images from a distributed computer network.

5. A method for implementing a visual map device, comprising the steps of:

storing visual image information in a map database coupled to said visual map device, said visual image information including at least one of route images and destination images that are each initially captured at a substantially eye-level viewpoint by utilizing a photographic imaging device;

providing said visual image information to a display device using a map application; and executing said map application with a processor coupled to said visual map device, said visual map device accessing said visual image information from an Internet network.

6. A method for implementing a visual map device, comprising the steps of:

storing visual image information in a map database coupled to said visual map device, said visual image information including at least one of route images and destination images that are each initially captured at a substantially eye-level viewpoint by utilizing a photographic imaging device;

providing said visual image information to a display device using a map application; and executing said map application with a processor coupled to said visual map device, said map database including at least one of a first database and a second database, said first database including sets of image data that each correspond to a different significant object that is viewable from a traveler's viewpoint along a selected route, said second database including sets of image data that each correspond to a different significant location that is viewable from a traveler's viewpoint at a selected destination.

7. A method for implementing a visual map device, comprising the steps of:

capturing visual image information in a digital format by utilizing an electronic photography device, said visual image information including route images and destination images that are captured at a substantially eye-level viewpoint, storing said visual image information in a map database that is locally coupled to said visual map device;

providing said visual image information to a display device using a map application that synchronizes said route images along a selected route, said map application also synchronizing said destination images at a destination that corresponds to said selected route; and executing said map application with a processor coupled to said visual map device, said map database including said route images, said destination images, map data, and detail information, said detail information including parking information, contact information, and entry access information for a particular destination.

8. A method for implementing a visual map device, comprising the steps of:

capturing visual image information in a digital format by utilizing an electronic photography device, said visual image information including. route images and destination images that are captured at a substantially eye-level viewpoint, storing said visual image information in a map database that is locally coupled to said visual map device;

providing said visual image information to a display device using a map application that synchronizes said route images along a selected route, said map application also synchronizing said destination images at a destination that corresponds to said selected route; and executing said map application with a processor coupled to said visual map device, said map database including said route images, said visual map device entering a route mode in which said map application initially determines a destination from destination information that is supplied by a wireless communications device.

9. A method for implementing a visual map device, comprising the steps of:

capturing visual image information in a digital format by utilizing an electronic photography device, said visual image information including route images and destination images that are captured at a substantially eye-level viewpoint, storing said visual image information in a map database that is locally coupled to said visual map device;

providing said visual image information to a display device using a map application that synchronizes said route images along a selected route, said map application also synchronizing said destination images at a destination that corresponds to said selected route; and executing said map application with a processor coupled to said visual map device, said map database including said route images, said map database including a first database and a second database, said first database including sets of image data that each corresponds to a different significant object that is viewable from a traveler's viewpoint along a selected route, said second database including sets of image data that each corresponds to a different significant location that is viewable from a traveler's viewpoint at a selected destination.

10. A method for implementing a visual map device, comprising the steps of:

capturing visual image information in a digital format by utilizing an electronic photography device, said visual image information including route images and destination images that are captured at a substantially eye-level viewpoint, storing said visual image information in a map database that is locally coupled to said visual map device;

providing said visual image information to a display device using a map application that synchronizes said route images along a selected route, said map application also synchronizing said destination images at a destination that corresponds to said selected route; and executing said map application with a processor coupled to said visual map device, said map database including said route images, said map database including a user-specific image database of selected images that a system user utilizes on a recurring basis, said map database further including a temporary image database that said system user utilizes on an infrequent basis.

11. A method for implementing a visual map device, comprising the steps of:

capturing visual image information in a digital format by utilizing an electronic photography device, said visual image information including route images and destination images that are captured at a substantially eye-level viewpoint, storing said visual image information in a map database that is locally coupled to said visual map device;

providing said visual image information to a display device using a map application that synchronizes said route images along a selected route, said map application also synchronizing said destination images at a destination that corresponds to said selected route; and executing said map application with a processor coupled to said visual map device, said map database including said route images, said visual map device having an automatic location-update mode in which said visual map device automatically determines and updates current geographic location information by utilizing location information from local information sensors, said visual map device also having a manual location-update mode in which a system user manually supplies said visual map device with appropriate geographic location information by utilizing a user interface.

* * * * *